United States Patent
Stamm et al.

(10) Patent No.: US 7,292,247 B2
(45) Date of Patent: Nov. 6, 2007

(54) DYNAMICALLY DETERMINING DIRECTIONS OF FREEDOM FOR CONTROL POINTS USED TO REPRESENT GRAPHICAL OBJECTS

(75) Inventors: Beat Stamm, Redmond, WA (US); Gregory C. Hitchcock, Woodinville, WA (US); Michael J. Duggan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 69 days.

(21) Appl. No.: 10/764,622

(22) Filed: Jan. 26, 2004

(65) Prior Publication Data

US 2005/0184991 A1    Aug. 25, 2005

(51) Int. Cl.
*G06T 11/00*    (2006.01)

(52) U.S. Cl. .................. 345/467; 345/468; 345/469

(58) Field of Classification Search ......... 345/467–469
See application file for complete search history.

(56) References Cited

U.S. PATENT DOCUMENTS

| | | | |
|---|---|---|---|
| 4,387,622 A | 6/1983 | Deutsch | 84/1.22 |
| 4,696,707 A | 9/1987 | Lewis et al. | 156/64 |
| 4,884,225 A | 11/1989 | Fogarty et al. | 364/559 |
| 5,155,805 A * | 10/1992 | Kaasila | 345/469 |
| 5,159,668 A * | 10/1992 | Kaasila | 345/469 |
| 5,319,358 A | 6/1994 | Martinez et al. | 345/141 |
| 5,325,479 A * | 6/1994 | Kaasila | 345/469 |
| 5,412,770 A | 5/1995 | Yamashita et al. | 395/142 |
| 5,465,323 A | 11/1995 | Mallet | 395/123 |
| 5,500,927 A | 3/1996 | Sander-Cederlof et al. | 395/133 |
| 5,539,841 A | 7/1996 | Huttenlocher et al. | 382/218 |
| 5,586,241 A | 12/1996 | Bauermeister et al. | 395/167 |
| 5,684,510 A | 11/1997 | Brassell et al. | 345/143 |
| 5,715,473 A | 2/1998 | Reed | 395/805 |
| 5,751,289 A | 5/1998 | Myers | 345/419 |
| 5,754,873 A | 5/1998 | Nolan | 395/789 |
| 5,760,787 A | 6/1998 | Piper | 345/442 |
| 5,777,627 A | 7/1998 | Takazawa | 345/469 |
| 5,781,714 A | 7/1998 | Collins et al. | 395/171 |

(Continued)

FOREIGN PATENT DOCUMENTS

WO    WO98/36630    8/1998

OTHER PUBLICATIONS

U.S. Appl. No. 10/764,745, filed Jan. 26, 2004, Beat Stamm, et al.

(Continued)

*Primary Examiner*—Jin-Cheng Wang
(74) *Attorney, Agent, or Firm*—Workman Nydegger

(57) ABSTRACT

The principles of the present invention relate to dynamically determining directions of freedom for control points used to represent graphical objects such as text. A computing system identifies a first function that represents a first constraint, solutions to the first function indicating compliance with the first constraint. The computing system calculates, based on the location of a control point and the identified first function, that the control point does not comply with the first constraint. The computing system automatically determines a first direction of freedom in which the control point can be moved to comply with the first constraint such that movement of the control point in the first direction of freedom has a reduced likelihood of causing non-compliance with other constraints.

16 Claims, 5 Drawing Sheets

U.S. PATENT DOCUMENTS

| | | | | |
|---|---|---|---|---|
| 5,805,832 | A | 9/1998 | Brown et al. | 395/752 |
| 5,854,855 | A | 12/1998 | Errico et al. | 382/187 |
| 5,898,439 | A | 4/1999 | Takazawa | 345/441 |
| 5,949,435 | A | 9/1999 | Brock et al. | 345/468 |
| 6,037,949 | A | 3/2000 | DeRose et al. | 345/430 |
| 6,048,116 | A | 4/2000 | Kumada | 400/76 |
| 6,088,041 | A | 7/2000 | Ballard et al. | 345/467 |
| 6,249,908 | B1* | 6/2001 | Stamm | 717/113 |
| 6,253,374 | B1 | 6/2001 | Dresevic et al. | 717/11 |
| 6,289,488 | B1 | 9/2001 | Dave et al. | 716/1 |
| 6,300,960 | B1* | 10/2001 | DeRose et al. | 345/474 |
| 6,363,405 | B1 | 3/2002 | Loginov | 708/270 |
| 6,373,489 | B1 | 4/2002 | Lu et al. | 345/428 |
| 6,441,846 | B1 | 8/2002 | Carlbom et al. | 348/169 |
| 6,452,597 | B1 | 9/2002 | Goldberg et al. | 345/472 |
| 6,456,305 | B1 | 9/2002 | Qureshi et al. | 345/800 |
| 6,529,197 | B1 | 3/2003 | Ballard et al. | 345/468 |
| 6,600,485 | B1 | 7/2003 | Yoshida et al. | 345/419 |
| 6,600,490 | B1 | 7/2003 | Brock et al. | 345/472 |
| 6,714,679 | B1 | 3/2004 | Scola et al. | 382/187 |
| 6,760,028 | B1 | 7/2004 | Salesin et al. | 345/469 |
| 6,778,698 | B1 | 8/2004 | Prakash et al. | 382/164 |
| 6,803,913 | B1 | 10/2004 | Fushiki et al. | 345/467 |
| 6,826,480 | B2 | 11/2004 | Picone et al. | 702/3 |
| 6,992,671 | B1 | 1/2006 | Corona | 345/467 |
| 2001/0002131 | A1 | 5/2001 | DeRose et al. | |
| 2001/0032029 | A1 | 10/2001 | Kauffman | 700/99 |
| 2001/0048764 | A1 | 12/2001 | Betrisey et al. | |
| 2003/0208473 | A1 | 11/2003 | Lennon | 707/3 |
| 2004/0109592 | A1 | 6/2004 | Bankman et al. | 382/128 |
| 2004/0160444 | A1 | 8/2004 | Salesin et al. | 345/471 |
| 2005/0005261 | A1 | 1/2005 | Severin | 717/108 |
| 2005/0100214 | A1 | 5/2005 | Zhang et al. | 382/179 |

OTHER PUBLICATIONS

U.S. Appl. No. 10/764,961, filed Jan. 26, 2004, Beat Stamm, et al.
U.S. Appl. No. 10/764,787, filed Jan. 26, 2004, Beat Stamm, et al.
Riccardo Di Federico, Mario Raffin, Paola Carrai, Giovanni Ramponi. *Image Processing: Algorithms and Systems II Interpolation of Images Containing Text For Digital Displays*, Proceedings of Electronic Imaging Science and Technology, 2003, pp. 42-53.
Garcia, Dan. *Discussion Section 3 Scan Conversion Distillations*. Published approximately Spring-Fall 1998, pp. 1-2.
Rogowitz Bernice E, Pappa, Thrasyvoulos N. *Resolution and Bit Depth: How Much is Enough?*, Human Vision and Electronic Imgaing V, Jan. 2000, pp. 28-36.
Shamir, Ariel and Rappoport, Ari. *Extraction of Typographic Elements From Outline Representations of Fonts*, Computer Graphics Forum, 1996.
Weisstein, Eric W. *Taylor Series*. From MathWorld—A Wolfram Web Resource. 1999.
Foley, James et al. *Computer Graphics: Principles and Practice. $2^{nd}$ Edition in C*. Addison-Wesley Publishing Company, New York, 1996. various pages.
*Designing Multiple Master Typefaces*. Adobe Systems Incorporated. 1995, 1997.
*Type 1 Font Format Supplement*. Adobe Developer Support, Technical Specification #5015. Adobe Systems Incorporated, May 15, 1994.

\* cited by examiner

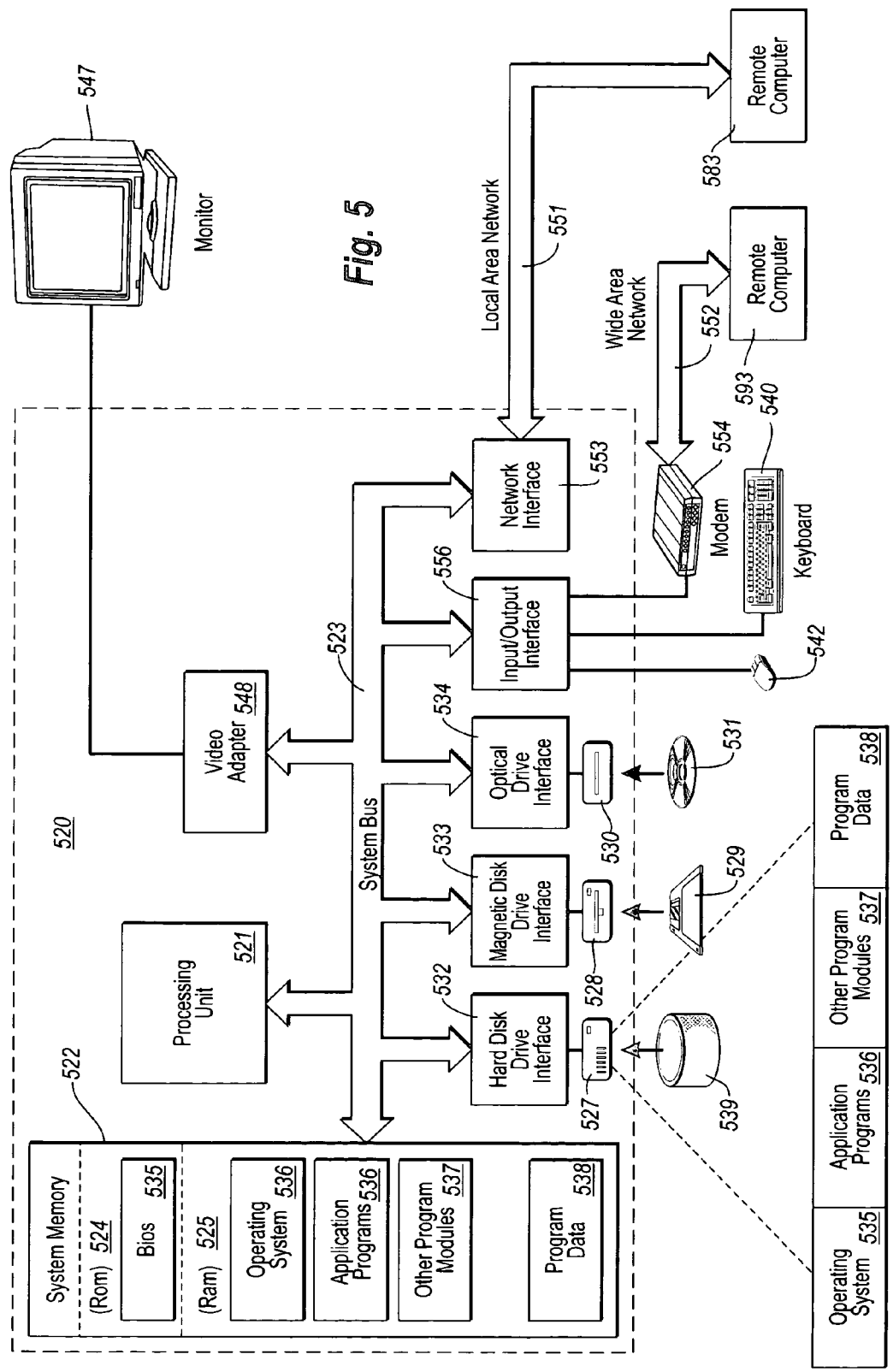

DYNAMICALLY DETERMINING DIRECTIONS OF FREEDOM FOR CONTROL POINTS USED TO REPRESENT GRAPHICAL OBJECTS

BACKGROUND OF THE INVENTION

1. The Field of the Invention

The present invention relates to manipulating control data used to generate outlines of graphical objects. More specifically, the present invention relates to dynamically determining directions of freedom for control points used to represent graphical objects such as text.

2. Background and Related Art

Computing technology has transformed the way we work and play. Computing systems now take a wide variety of forms including desktop computers, laptop computers, tablet PCs, Personal Digital Assistants (PDAs), and the like. Even household devices (such as refrigerators, ovens, sewing machines, security systems, and the like) have varying levels of processing capability and thus may be considered computing systems. As time moves forward, processing capability may be incorporated into a number of devices that traditionally did not have processing capability. Accordingly, the diversity of computing systems may likely increase.

Almost all computing systems that interface with human beings use a display to convey information. In many cases, the appeal of the display is considered an important attribute of the computing system. Historically, textual information (e.g., Latin-based characters) was displayed in cells of a Cathode Ray Tube ("CRT") display device. Each cell was divided into a grid of equally sized grid positions wherein each grid position could be turned on or off. For example, each cell of a CRT could be an 8×8 grid resulting in 64 possible grid positions per cell.

Each character of a character set was stored as a memory image (a bit-map) in the hardware of the CRT display device (e.g., in the video adapter). A memory image included a number of binary values (e.g., 64 binary values for displaying a character on an 8×8 grid), where each binary value corresponded to a specified grid position. One value (e.g., binary "1") represented that a corresponding grid position was to be "on" when the character was displayed and another value (e.g., a binary "0") represented that a corresponding grid position was to be "off" when the character was displayed. Upon receiving binary data (e.g., a bit-map) representing a character, the CRT would "turn on" grid positions corresponding to a binary 1 and would "turn off" grid positions corresponding to a binary 0 to display the character.

To somewhat reduce the computing system resources needed to store bit-maps, some operating systems have used proportional bit-maps (e.g., stored on disk) that vary in cell size depending on the character that is to be displayed. For example, in a proportional bit-map character set, the cell for the letter "i" could be more narrow (e.g., width of 3 grid positions or pixels) than the cell for the letter "h" (e.g., width of 6 grid positions or pixels).

However, storing characters as bit-maps (either fixed or proportional) can still consume significant computing system resources. Since a computing system may need to display and print characters of a font (typically 256 or more different characters) at a variety of different sizes, storage of a significant number of different sized bit-maps may be required. For example, it may desirable to have a word processor display and print characters of a font in sizes ranging from 4 pt to 72 pt. Thus, a computing system running the word processor would potentially have to store 68 (72 minus 4) different sizes of bit-maps for displaying the font at different sizes.

Further, since printers typically have different (and for the most part higher) resolution than displays, the computing system would potentially also have to store a corresponding 68 (72 minus 4) different sizes of bit-maps for printing the font at different sizes. For example, a bitmap of an 8×5 grid (requiring 40 bits of storage) may be used to display a character at a specified size, while a bit-map of a 50×30 grid (requiring 1500 bits of storage) is used to print the character at the specified size.

The storage requirement problems associated with bit-map fonts is further compounded when a computing device is to display and print characters from different fonts. That is, the computing device may need to store bit-maps for representing a variety of different fonts at a variety of different sizes. Thus, in the above example, configuring the word processor to use 50 different fonts could result in well over 5,000 different sets of bit-maps (e.g., (68+68)*50). Since many character sets include 256 or more characters, this could easily result over 1 million individual bit-maps (e.g., 5,000*256). Storing bit-maps for underlined, bold, and/or italicized versions of each font can further increase the storage requirements. Further, producing a large number of bitmaps by hand is extremely time consuming.

Accordingly, even more recently, graphics primitives have been used to describe characters of a font. For example, a set of control points and instructions for connecting the points (e.g., connect with a straight line, an arc, a bezier, etc.) can be used to define the outline of a character in an arbitrary grid space (e.g., an arbitrary grid space greater than the highest resolution of a pixelated device). Often, characters will be defined for display at higher resolutions and then mathematically scaled down when the characters are to be rendered at lower resolutions. Thus, only one representation of a character (per font) need be stored.

To scale a character down the location of control points can be divided by a scaling factor. For example, to scale a character down by a scaling factor of 10, the coordinates of each control point defining the character (at the higher resolution) can be divided by 10. It may be that control points defining a character for display on a 100×100 grid are to be scaled down for display on a 10×10 grid. Thus, a control point at grid position (50, 30) can be scaled down to a control point at grid position (5, 3), a control point at grid position (70, 70) can be scaled down to a control point at grid position (7, 7), etc. Accordingly, a smaller outline representing the character may be calculated and there is a reduced need for storing a number of different sizes of bit-maps for the character.

The smaller outline can then be analyzed to identify grid locations that are to be turned on and to identify grid locations that are to be turned off (a process often referred to as "scan conversion"). One scan conversion algorithm determines if the center of a grid position is inside or outside the smaller outline. When the center of a grid position is inside the smaller outline the grid position is turned on. On the other hand, when the center of a grid position is outside the smaller outline the grid position is turned off.

Also, when rendering a character, portions of the character may be required to conform to one or more constraints. A constraint may be expressed as an algorithm defining one or more dependent parameters in terms of one or more independent parameters. Constraints for one control point can be expressed in terms of the location of other control points or locations on a grid (e.g., a capitalization line). For example, the position of a first control point can be expressed in terms of the position of a second control point such that the first control point is a fixed distance from the second control point. Thus, when the second control point is moved, a corresponding move of the first control point may be required so that the first control point conforms to the fixed distance constraint.

Due, in part, to the wide variety of different artistic and technical features in different fonts, constraints are often tailored to individual fonts. To satisfy a constraint, dependent parameters of a control point will often have to give way. Generally, a dependent parameter of a control point will give way in a predetermined direction (which may be referred to as a "freedom vector"). After a control point is moved, the control point can be checked to determine if it still conforms to any constraints placed on the control point. Checking a control point can include taking a scalar measurement in a specified direction (which may be referred to as the "projection vector"). For example, referring back to the above example of a first and second control point, the first control point may need to be moved along a freedom vector until the distance between the first and second control points, measured along a corresponding projection vector, equals the fixed distance.

At times, a control point can be subject to more than one constraint. For example, as depicted in FIG. 1, control point 106 is to conform to two constraints. A first constraint indicates that the distance between control point 106 and edge 101 in the direction of projection vector 103 is to equal distance constraint 107. A second constraint indicates that the distance between control point 106 and edge 102 in the direction of projection vector 104 is to equal constraint distance 108. If control point 109 is moved (e.g., to conform with an independent constraint), control point 106 is also required to be moved such that control point 106 still complies with the fist and second constraints. Typically, control point 106 will be moved along freedom vectors that correspond to each of the two constraints.

Accordingly, inappropriate selection of freedom vectors can result in the inability to comply with constraints. For example, if control point 109 is moved in a vertical direction, it would be difficult for control point 106 to comply with distance constraint 107 if the freedom vector corresponding to distance constraint 107 is in a horizontal direction (i.e., parallel to the X-axis).

Further complications can arise when a control point is to comply with a plurality of constraints. For example, when there are two constraints on a control point, a freedom vector corresponding to the second applied constraint must be set in a direction perpendicular to a projection vector corresponding to the first applied constraint. Failure to set the freedom vector corresponding to the second applied constraint perpendicular to the projection vector corresponding to the first applied constraint can result in compliance with the first applied constraint being undone. For example, any movement on the Y-axis subsequent to moving control point 106 to comply with distance constraint 107 would undo the compliance with distance constraint 107. Thus, the freedom vector for distance constraint 108 (when applied after distance constraint 107) would have to be solely in the X direction (or horizontal).

Further, movement along diagonal freedom vectors can result in numerical errors (e.g., due to rounding) in the rendering process. For example, determining a freedom vector for distance constraint 108 prior to determining a freedom vector for distance constraint 107 would result in a diagonal freedom vector (perpendicular to projection vector 104). Moving along a diagonal freedom vector to comply with distance constraint 107 carries an increased risk that X or Y value for the resulting location of control point 106 will include a fractional grid location value.

To implement constraints for a font, character outlines can be supplemented with rules (often referred to as "hints") expressed in terms of formal languages, such as, for example, TrueType®. For example, the outline of a character can be supplemented with TrueType® instructions that indicate the width of a vertical stroke (e.g., of an 'H') is to be a fixed distance. Hinting has typically been a manual process performed by a human typographer. That is, a human typographer views a character subject to a number of constraints and supplements the outline of the character with computer-executable instructions (e.g., TrueType® instructions) that indicate how to render the character in a manner that complies with the one or more constraints. When the character is to be rendered, a computing system processes the computer-executable instructions and renders the character in accordance with the rules implemented in the computer-executable instructions.

Manual hinting is advantageous since a human typographer can typically recognize, by viewing a character, if the character is appropriately rendered. Alternately, the human typographer can perform an iterative process where hints are added, viewed, and changed repeatedly until a desired rendering is obtained. That is, a human typographer can determine when a character does or does not comply with constraints and can change hints until compliance is obtained. For example, a human typographer can identify that the edges of the vertical stroke of a "T" are not parallel and add (or change) hints so that the edges are parallel. However, manual hinting can consume a considerable amount of time. For example, it may take weeks or even months for a trained typographer to hint a single font.

Automated hinting, as performed by a computing system, is difficult to implement since a computing system has no inherent understanding of freedom vectors or how to select freedom vectors that increase the likelihood of complying with constraints. For example, given a set of control points representing a character, a computing system may have no way to determine an appropriate order for applying multiple constraints to a control point. Thus, a computing system may generate freedom vectors that cause compliance with a previously applied constraint to be undone or may generate freedom vectors with a higher likelihood of causing numerical errors (e.g., diagonal freedom vectors). Therefore, what would be advantageous are mechanisms for dynamically determining directions of freedom used to move control points for compliance with constraints.

BRIEF SUMMARY OF THE INVENTION

The principles of the present invention relate to systems, methods, and computer program products for dynamically determining directions of freedom for control points used to represent graphical objects such as text. A computing system identifies a first function that represents a first constraint, solutions to the first function indicating compliance with the first constraint. The computing system calculates, based on the location of a control point and the identified first function, that the control point does not comply with the first constraint. The computing system automatically determines a direction of freedom for the first constraint such that movement of the control point in the direction of freedom has a reduced likelihood of causing non-compliance with other constraints.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 illustrates a suitable operating environment for implementing the principles of the present invention.

DETAILED DESCRIPTION OF THE PREFERRED EMBODIMENTS

Figure 1:
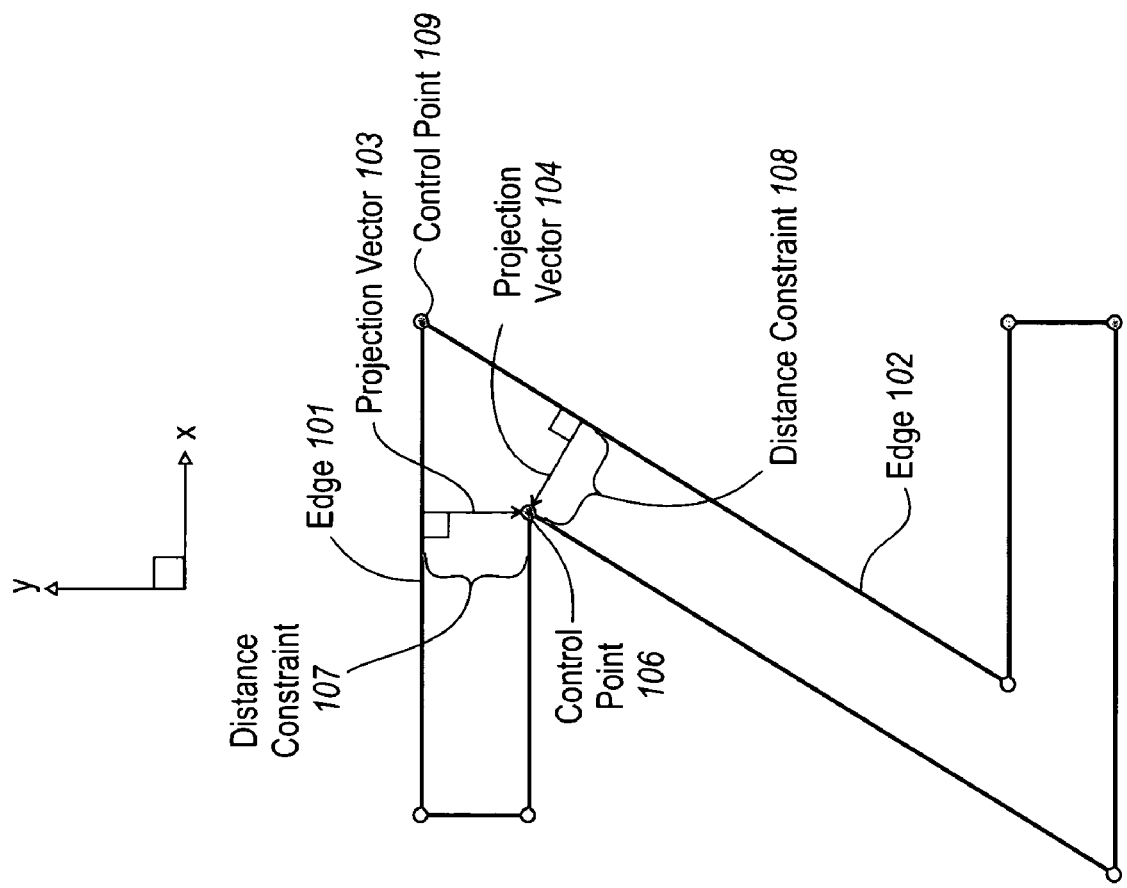
FIG. 1 illustrates a prior art representation of a graphical object.

The principles of the present invention relate to systems, methods, and computer program products for dynamically determining directions of freedom for control points used to represent graphical objects such as text. A computer system receives a set control points (e.g., containing control point locations and computer-executable instructions defining constraints on the control points). The computer system identifies a first projection vector corresponding to a first constraint for a control point (e.g., from contained computer-executable instructions). The computer system determines which of two perpendicular axes (e.g., an X axis and Y axis that is perpendicular to the X axis) is closer to the first projection vector. The computer system sets the direction of a first freedom vector (indicating a direction the control point can move to comply with the first constraint) in the direction of the closer axis.

When the control point is to comply with a plurality of constraints, the computer system sets the direction of a second freedom vector (indicating a direction the control point can move to comply with the second constraint) perpendicular to the first projection vector. Accordingly, the control point can move in a direction perpendicular to the first projection vector to comply with the second constraint in a manner that has a reduced likelihood of causing subsequent non-compliance with the first constraint. The computer system can also translate constraints in an appropriate order to reduce the likelihood of movement along freedom vectors causing numerical errors when a corresponding graphical object is rendered.

Embodiments within the scope of the present invention include computer-readable media for carrying or having computer-executable instructions or data structures stored thereon. Such computer-readable media may be any available media accessible by a general-purpose or special-purpose computing system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computing system.

In this description and in the following claims, a "network" is defined as one or more data links that enable the transport of electronic data between computing systems and/or modules. When information is transferred or provided over a network or another communications connection (either hardwired, wireless, or a combination of hardwired or wireless) to a computing system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computing system or special-purpose computing system to perform a certain function or group of functions. The computer executable instructions may be, for example, binaries, intermediate format instructions such as assembly language, or even source code.

In this description and in the following claims, a "computing system" is defined as one or more software modules, one or more hardware modules, or combinations thereof, that work together to perform operations on electronic data. For example, the definition of computing system includes the hardware components of a personal computer, as well as software modules, such as the operating system of the personal computer. The physical layout of the modules is not important. A computing system may include one or more computers coupled via a network. Likewise, a computing system may include a single physical device (such as a mobile phone or Personal Digital Assistant "PDA") where internal modules (such as a memory and processor) work together to perform operations on electronic data.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Those skilled in the art will appreciate that the invention may be practiced in network computing environments with many types of computing system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Figure 2:
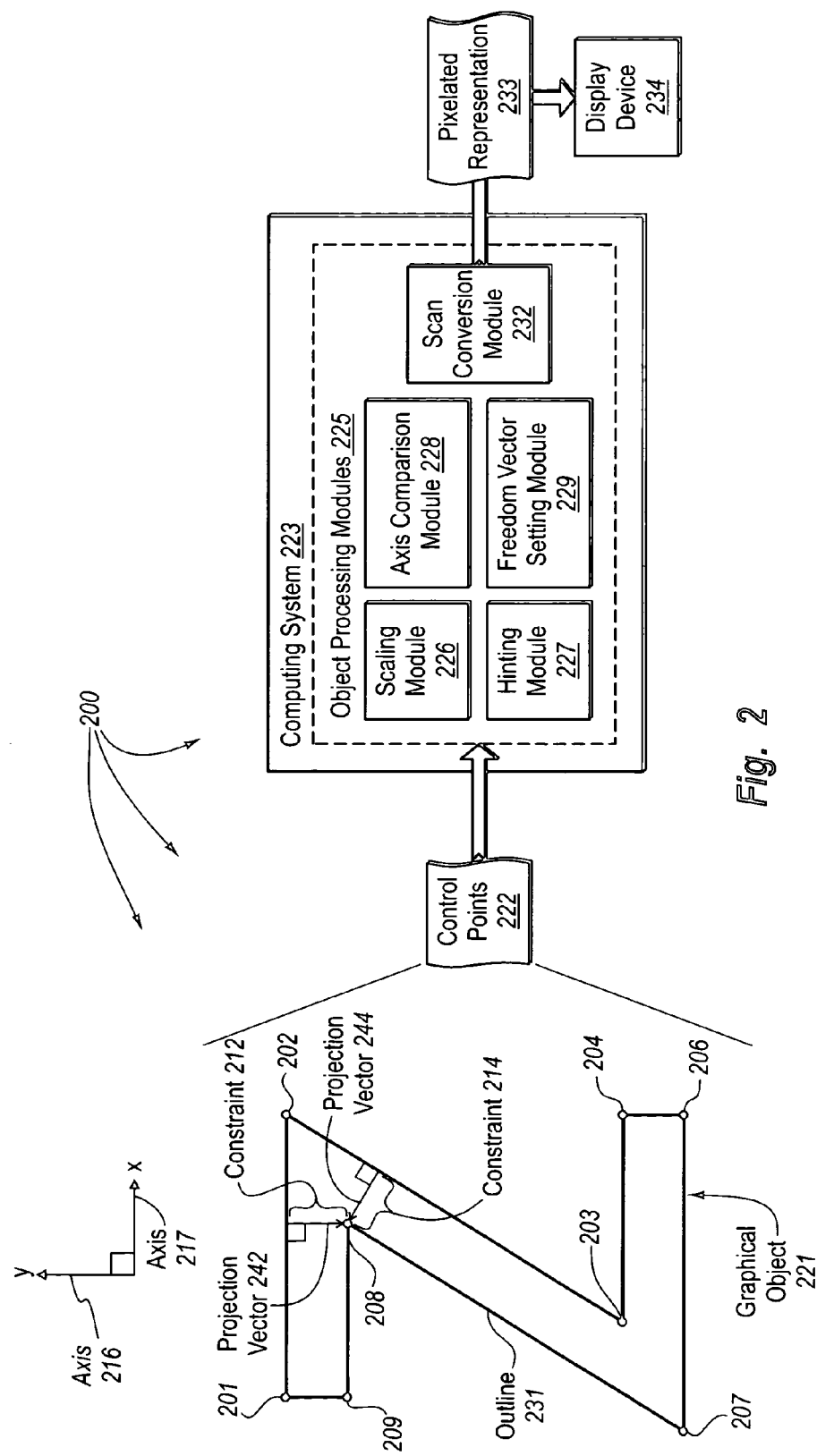
FIG. 2 illustrates an example computer architecture for dynamically determining directions of freedom for control points used to represent graphical objects.

FIG. 2 illustrates an example of computer architecture 200 for dynamically determining directions of freedom for control points used to represent graphical objects in accordance with the principles of the present invention. Within computer architecture 200, computing system 223 includes object processing modules 225 that can interoperate to render a graphical object such as a character of text. Generally, object processing modules 225 receive a set of control points (e.g., control points 222) representing a graphical object (e.g., graphical object 221) and output a pixelated representation (e.g., pixelated representation 233) of the graphical object that can be rendered at a display device (e.g., display device 234).

One or more control points in control points 222 can be constrained by the location of other control points or constrained to pre-determined locations on a pixel grid (e.g., a capitalization line). A control point can be subject to a variety of different types of constraints, such as, for example, distance and proportion constraint. Mathematical functions can be used to represent constraints. For example, the function $[\sqrt{dx^2+dy^2})-c]$ can be used to represent a distance constraint between two control points. Other functions can be used to represent proportion constraints. For example, a mathematical function (or functions) can indicate that a control point P, between control points $Q_1$ and $Q_2$, is to maintain relative proportional distances from $Q_1$ to P and from P to $Q_2$. A solution (e.g., an approximation of a "zero") to a mathematical function can indicate that the control points used as input to the mathematical function are in compliance with the corresponding constraint.

Within object processing modules 225, scaling module 226 can scale down a larger outline (e.g., representing an object at a larger size point size) to a smaller outline so as to facilitate rendering the represented object at a smaller size (e.g., a smaller point size). For example, scaling module 226 can scale down an outline representing the letter "D" at 96 point to a smaller outline representing the letter "D" at 12 point. Hinting module 227 can hint control points of a smaller outline (by executing computer-executable instructions) such that the represented object is appropriately rendered at the smaller size. For example, hinting module 227 can apply hints to the smaller outline representing the letter "D" to alter the smaller outline such that a 12 point letter "D" is appropriately rendered at a display device. Scan conversion module 232 can identify, based in part on a hinted outline received from hinting module 227, what pixels are to be turned on inside the hinted outline. For example, scan conversion module 232 can identify pixels inside the vertical stroke of the letter "D" that are to be turned on. Scan conversion module 232 can turn on appropriate pixels to generate a pixelated representation of the letter "D" (e.g., pixelated representation 233).

Axis comparison module 228 can determine an axis (e.g., from two perpendicular axes) that is closer to a constraint's projection vector. Freedom vector setting module 129 can set a constraint's freedom vector based at least in part on an identified closer axis. Hinting module 227 can receive input from axis comparison module 228 and/or freedom vector setting module 129 when determining how to hint an outlines to facilitate rendering an object at the smaller size.

Control points 222 can include data representing control point locations (e.g., the location of control points 201, 202, 203, 204, 206, 207, 208, and 209) and data indicating how control points are to be connected to generate outline 231. A font file corresponding to control points 222 (e.g., a font file containing control points for other characters of the same font) can store computer-executable instructions (hints e.g., in the form of TrueType® instructions) that, when executed (e.g., at hinting module 227), potentially modify control point locations for rendering. As depicted in computer architecture 200, control points 222 represent an outline (outline 231) of the letter "Z". However, control points 222 is merely one example of control points. It would be apparent to one skilled in the art, after having reviewed this description, that the principles of the present invention can practiced with control points representing virtually any outline of virtually any graphical object.

Figure 3:
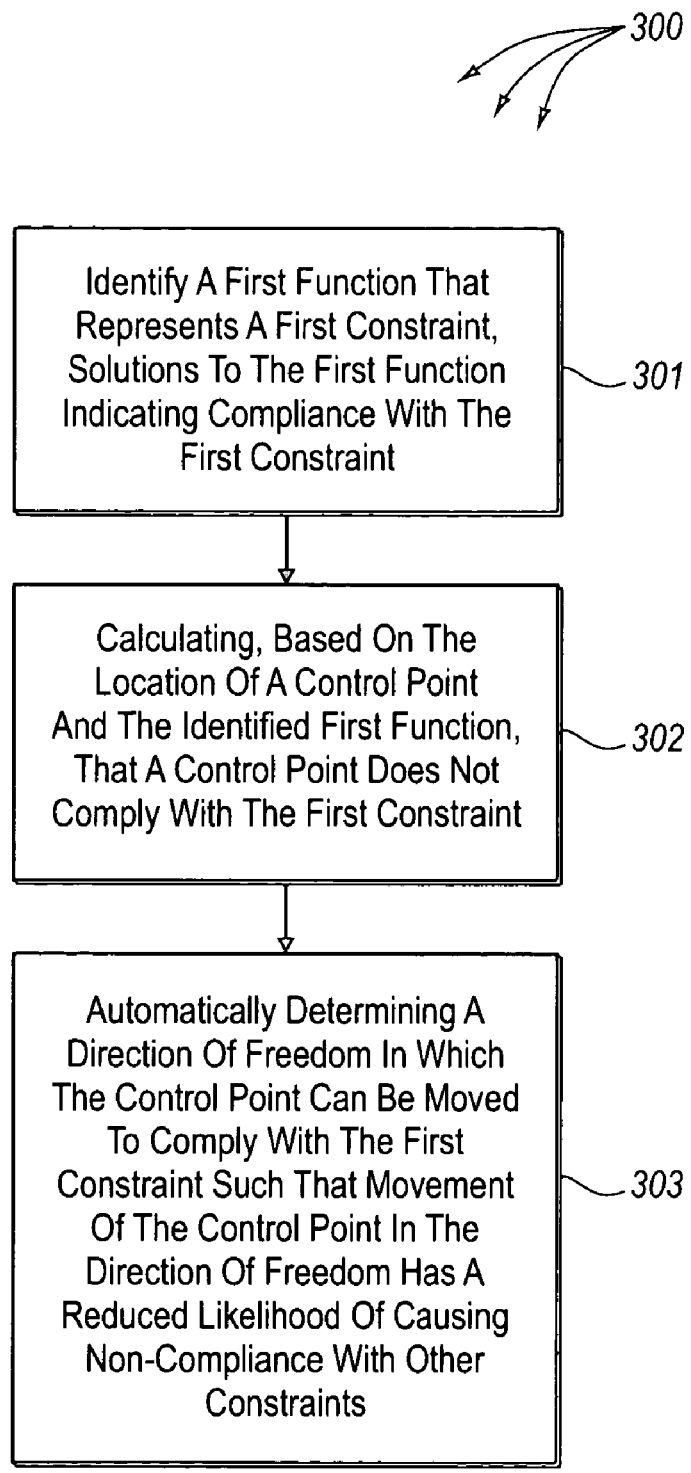
FIG. 3 illustrates a flowchart of an example method for dynamically determining directions of freedom for control points used to represent graphical objects.

FIG. 3 illustrates a flowchart of a method 300 for dynamically determining directions of freedom for control points used to represent graphical objects. The method 300 will be described with respect to the computing system, modules, and data depicted in FIG. 2.

The method 300 includes an act of identifying a first function that represents a first constraint, solutions to the first function indicating compliance with the first constraint (act 301). For example, object processing modules 225 can identify functions representing constraints 212 and 214. Object processing modules 225 can further determine that control point 208 is to comply with constraints 212 and 214. It may be that object processing modules 225 processes computer-executable instructions (e.g., TrueType® instructions) contained in control points 222 to identify functions representing constraints 212 and 214 and determine that control point 208 is to comply with constraints 212 and 214.

The method 300 includes an act of calculating, based on the location of a control point and the identified first function, that a control point does not comply with the first constraint (act 302). For example, object processing modules 225 can calculate, based on the location of control point 208 and a function representing constraint 212, that control point 208 does not comply with constraint 212. As previously described, compliance with a constraint can be determined by identifying a solution to a function representing a constraint. For a distance constraint, a solution can represent the measurement of a distance from the control point, in a direction of compliance (in TrueType® referred to as a "projection vector"), to another portion of the outline or to a pre-determined location.

When the measured distance is within a tolerance of the constraint distance (e.g., an approximation of a zero) the control point is viewed as complying with the constraint. For example, when the distance between control point 208 and the line formed by control point 201 and 202 is within a tolerance of the distance represented by constraint 212, control point 208 can be viewed as complying with constraint 212. On the other hand, when the measured distance is not within a tolerance of the constraint distance the control point is viewed as not complying with the constraint. For example, when the distance between control point 208 and the line formed by control point 201 and 202 is not within a tolerance of the distance represented by constraint 212, control point 208 can be viewed as not complying with constraint 212. When appropriate, object processing modules 225 can make similar determinations for proportion constraints.

The method 300 includes an act of automatically determining a direction of freedom in which the control point can be moved to comply with the first constraint such that movement in the direction of freedom has a reduced likelihood of causing non-compliance with other constraints (act 303). For example, object processing modules 225 can determine a direction of freedom (in TrueType® referred to as a "freedom vector") in which control point 208 can be moved to comply with constraint 212 such that movement in the direction of freedom has a reduced likelihood of causing non-compliance with constraint 214.

It may be that determining a direction of freedom includes calculating that a direction of compliance for a constraint is closer to the direction of a first axis than to the direction of a second axis. In some embodiments, the first axis is perpendicular to the second axis. For example, in a two dimensional coordinate system there may be an X-axis and a Y-axis that is perpendicular to the X-axis. Axis comparison module 228 can calculate a first angle from the first projection vector to a first axis (e.g., a horizontal X-axis, such as axis 217) and can calculate a second angle from the first projection vector to a second axis (e.g., a vertical Y-axis, such as axis 216). When the first angle is smaller than the second angle, the first projection vector is closer to the X-axis (and thus the X-axis is the first axis). On the other hand, when the second angle is smaller than the first angle, the projection vector is closer to the Y-axis (and thus the Y-axis is the first axis).

For example, axis comparison module 228 can calculate that projection vector 242 is closer to axis 216 (a Y axis) than to axis 217 (an X axis). That is, the angle between projection vector 242 and axis 216 approximates zero degrees and the angle between projection 242 and axis 217 approximates 90 degrees. On the other hand, axis comparison module 228 can calculate that projection vector 244 is closer to axis 217 (an X axis) than to axis 216 (a Y axis). That is, the angle between projection vector 244 and axis 217, for example, approximates 30 degrees and the angle between projection vector 244 and axis 216, for example, approximates 60 degrees. When the first and second angles are equal (e.g., when the first projection vector approximates 45, 135, 225, or 315 degrees) the computer system can be configured to default to one of the axes.

A further act of setting the direction of freedom to the direction of the first axis can be performed. For example, when projection vector 242 is the first projection vector, freedom vector setting module 229 can set a first freedom vector (for constraint 212) to the direction of axis 216. Accordingly, control point 208 can then move in the direction of axis 216 (positively or negatively) to comply with constraint 212 in manner that has little, if any, affect on constraint 214. On the other hand, when projection vector 244 is the first projection vector, vector setting module 229 can set a first freedom vector (for constraint 214) to the direction of axis 217. Accordingly, control point 208 can move in the direction of axis 217 (positively or negatively) to comply with constraint 214.

It may be that a control point is to comply with a single constraint. For example, a control point on one side of the outline of the vertical stroke of a "T" may be constrained to a certain distance from the other edge of the vertical stroke of the "T". Thus, calculating a direction of freedom for the single constraint provides the appropriate freedom for moving the control point to a location that complies with the single constraint.

A control point may alternately be made to comply with a plurality of constraints. A computing system can determine that a control point is to comply with a plurality of constraints by processing computer-executable instructions (e.g., TrueType® instructions) included in a set of control points. For example, in a two-dimensional coordinate system, each control point in the xy-plane can comply with up to two linearly independent constraints. That is, a control point can comply with a first constraint in a first direction and subsequently comply with a second constraint in a second direction which is not parallel to the first direction. In a three dimensional coordinate system, each control point in xyz-space can comply with up to three linearly independent constraints. A first constraint can limit subsequent freedom vectors to a two-dimensional plane which is perpendicular to the first projection vector, and two other constraints can limit the control points within two-dimensional plane. For an n-dimensional coordinate system each control point in resulting n-dimensional space can comply with n linearly independent constraints.

When a control point is made to comply with a plurality of constraints, the method 200 can include additional acts of determining and setting a second direction of freedom that is perpendicular to the first direction of compliance. The second direction of freedom indicates a direction in which the control point can move to comply with a second constraint in a manner that has a reduced likelihood of causing non-compliance with the first constraint. For example, when projection vector 242 is the first projection vector, freedom vector setting module 229 can set a second freedom vector (for constraint 214) perpendicular to projection vector 242 (i.e., to the direction of axis 217). Accordingly, control point 208 can move in the direction of axis 217 (positively or negatively) to comply with constraint 214 in a manner that has a reduced affect on prior movements for complying with constraint 212. On the other hand, when projection vector 244 is the first projection vector, freedom vector setting module 229 can set a second freedom vector (for constraint 212) perpendicular to projection vector 244. Accordingly, control point 208 can move in the direction perpendicular to projection vector 244 (positively or negatively) to comply with constraint 212 in a manner that has a reduced affect on prior movements for complying with constraint 214.

It may be that a control point is made to comply with two constraints such that a first direction of compliance for a first constraint is along an axis (e.g., along the X or Y axis) and a second direction of compliance for a second constraint is in a diagonal direction. Freedom vector setting module 229 can include functionality for determining an appropriate order for setting corresponding directions of freedom before the directions of freedom are set. Setting corresponding directions of freedom in an appropriate order can reduce the likelihood of causing numerical errors when a graphical object is rendered.

Figure 4A:
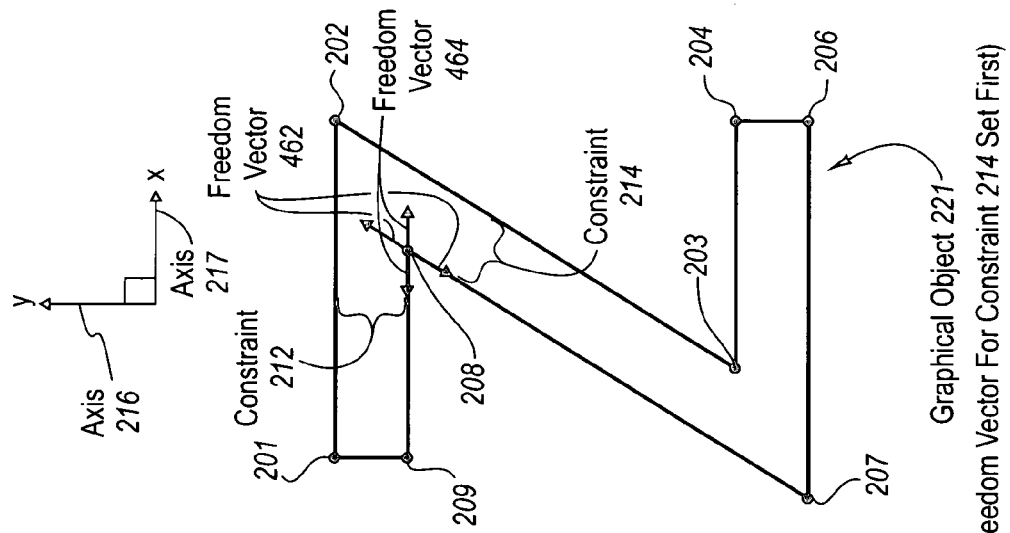
FIG. 4A illustrates a first example of freedom vectors for a control point on the outline of a graphical object.

For example, with respect to constraints 212 and 214, freedom vector setting module 229 can set the direction of a first freedom vector corresponding to constraint 212 before setting the direction of a second freedom vector corresponding constraint 214. Accordingly, since the second freedom vector is set perpendicular to the first projection vector (projection vector 242) the direction of the second freedom vector is set to the direction of an axis (and not diagonal). For example, FIG. 4A illustrates a first example of freedom vectors that result from setting the freedom vector for constraint 212 before the setting the freedom vector for constraint 214. Depicted in FIG. 4A, freedom vector 452 corresponds to constraint 212 and freedom vector 454 (perpendicular to projection vector 242) corresponds to constraint 214.

Although diagonal projection vectors can cause numerical errors when rendering a graphical object, it may be difficult (or impossible) to eliminate diagonal projection vectors with appropriate ordering. For example, control points on outlines of the letters "M" and "W" can be constrained diagonally in two directions. Thus, any ordering for setting directions of freedom for such control points can result in a diagonal freedom vector (since direction of freedom is to be perpendicular to a diagonal direction of compliance). Further, while some embodiments of the invention facilitate reducing numerical errors, the invention is not limited to these embodiments. That is, embodiments of the present invention can be practiced to set diagonal directions of freedom.

Figure 4B:
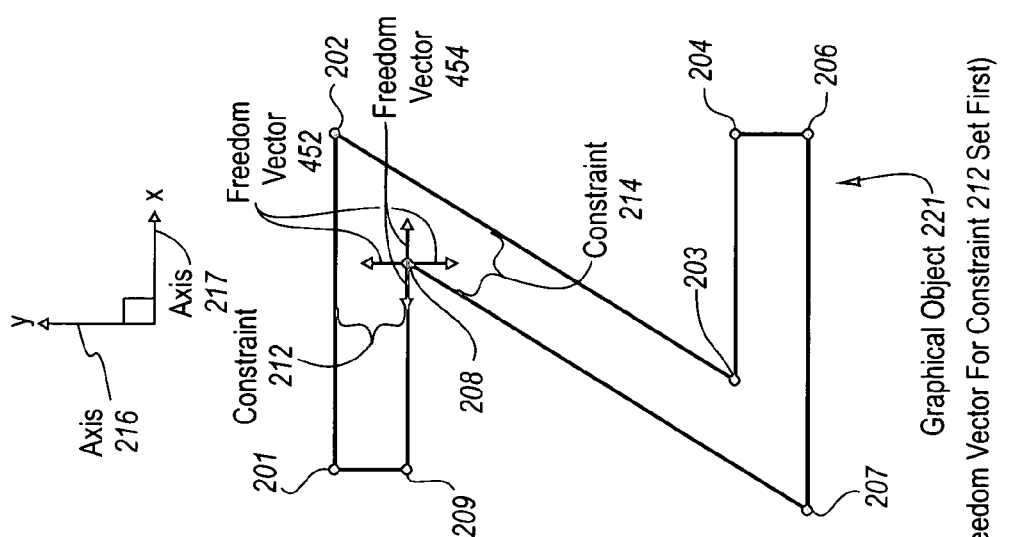
FIG. 4B illustrates a second example of freedom vectors for a control point on the outline of a graphical object.

For example, FIG. 4B illustrates a second example of freedom vectors that result from setting the freedom vector for constraint 214 before setting the freedom vector for constraint 212. Depicted in FIG. 4B, freedom vector 462 (perpendicular to projection vector 244) corresponds to constraint 212 and freedom vector 464 corresponds to constraint 214.

The following pseudo-code represents an example of an algorithm that can be executed to set directions of freedom for a control point. The pseudo-code algorithm can be implemented in computer-executable instructions of any of a variety of programming languages.

Line 1: For each control point P in a set of control points do
Line 2: if there are 0 constraints on P then
Line 3: there is nothing to do
Line 4: else if there is 1 constraint on P then
Line 5: if direction of compliance of constraint is in X direction then
Line 6: set direction of freedom to X direction
Line 7: else if direction of compliance of constraint is in Y direction then
Line 8: set direction of freedom to Y direction
Line 9: else
Line 10: direction of compliance of constraint is diagonal hence set direction of freedom to X direction or to Y direction, whichever is closer
Line 11: endif
Line 12: else
Line 13: there are 2 constraints on P hence
Line 14: if first direction of compliance of constraint 1 is in X direction then
Line 15: set first direction of freedom to X direction
Line 16: else if first direction of compliance of constraint 1 is in Y direction then
Line 17: set first direction of freedom to Y direction
Line 18: else
Line 19: first direction of compliance of constraint 1 is diagonal hence set first direction of freedom to X direction or to Y direction, whichever is closer
Line 20: endif
Line 21: set second direction of freedom perpendicular to the first direction of compliance
Line 22: endif
Line 23: endfor Within the pseudo-code example, lines 4 through 11 are executed when a control point in a set of control points (e.g., in control points 222) is to comply with one constraint and lines 13 through 21 are executed when a control point in a set of control points (e.g., in control points 222) is to comply with two constraints.

Embodiments of the present invention can include computer-executable instructions for implementing the algorithm represented in the pseudo-code example. For example, freedom vector setting module 229 may include computer-executable instructions for implementing the algorithm represented in the pseudo-code example. Freedom vector setting module 229 can execute the algorithm represented in the pseudo-code example for each control point in control points 222.

FIG. 5 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 5, an example system for implementing the invention includes a general-purpose computing device in the form of computer system 520, including a processing unit 521, a system memory 522, and a system bus 523 that couples various system components including the system memory 522 to the processing unit 521. Processing unit 521 can execute computer-executable instructions designed to implement features of computer system 520, including features of the present invention. The system bus 523 may be any of several types of bus structures including a memory bus or memory controller, a peripheral bus, and a local bus using any of a variety of bus architectures. The system memory includes read only memory ("ROM") 524 and random access memory ("RAM") 525. A basic input/output system ("BIOS") 526, containing the basic routines that help transfer information between elements within computer system 520, such as during start-up, may be stored in ROM 524.

The computer system 520 may also include magnetic hard disk drive 527 for reading from and writing to magnetic hard disk 539, magnetic disk drive 528 for reading from or writing to removable magnetic disk 529, and optical disk drive 330 for reading from or writing to removable optical disk 531, such as, or example, a CD-ROM or other optical media. The magnetic hard disk drive 527, magnetic disk drive 528, and optical disk drive 530 are connected to the system bus 523 by hard disk drive interface 532, magnetic disk drive-interface 533, and optical drive interface 534, respectively. The drives and their associated computer-readable media provide nonvolatile storage of computer-executable instructions, data structures, program modules, and other data for the computer system 520. Although the example environment described herein employs magnetic hard disk 539, removable magnetic disk 529 and removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 539, magnetic disk 529, optical disk 531, ROM 524 or RAM 525, including an operating system 535, one or more application programs 536, other program modules 537, and program data 538. A user may enter commands and information into computer system 520 through keyboard 540, pointing device 542, or other input devices (not shown), such as, for example, a microphone, joy stick, game pad, scanner, or the like. These and other input devices can be connected to the processing unit 521 through input/output interface 546 coupled to system bus 523. Input/output interface 546 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 547 or other display device is also connected to system bus 523 via video interface 548. Monitor 547 can display graphical objects, including text, generated by computer system 520. Other peripheral devices (not shown), such as, for example, speakers, printers, and scanners, can also be connected to computer system 520. Printers connected to computer system 547 can print graphical objects, including text, generated by computer system 520.

Computer system 520 is connectable to networks, such as, for example, an office-wide or enterprise-wide computer network, a home network, an intranet, and/or the Internet. Computer system 520 can exchange data with external sources, such as, for example, remote computer systems, remote applications, and/or remote databases over such networks.

Computer system 520 includes network interface 553, through which computer system 520 receives data from external sources and/or transmits data to external sources. As depicted in FIG. 5, network interface 553 facilitates the exchange of data with remote computer system 583 via link 551. Network interface 553 can logically represent one or more software and/or hardware modules, such as, for example, a network interface card and corresponding Network Driver Interface Specification ("NDIS") stack. Link 551 represents a portion of a network (e.g., an Ethernet segment), and remote computer system 583 represents a node of the network.

Likewise, computer system 520 includes input/output interface 546, through which computer system 520 receives data from external sources and/or transmits data to external sources. Input/output interface 546 is coupled to modem 554 (e.g., a standard modem, a cable modem, or digital subscriber line ("DSL") modem), through which computer system 520 receives data from and/or transmits data to external sources. As depicted in FIG. 5, input/output interface 546 and modem 554 facilitate the exchange of data with remote computer system 593 via link 552. Link 552 represents a portion of a network and remote computer system 593 represents a node of the network.

While FIG. 5 represents a suitable operating environment for the present invention, the principles of the present invention may be employed in any system that is capable of, with suitable modification if necessary, implementing the principles of the present invention. The environment illustrated in FIG. 5 is illustrative only and by no means represents even a small portion of the wide variety of environments in which the principles of the present invention may be implemented.

In accordance with the present invention, object processing modules, such as, for example, object processing modules 225, as well as associated program data, such as, for example, control points 222 and pixelated representation 233, can be stored and accessed from any of the computer-readable media associated with computer system 520. For example, portions of such modules and portions of associated program data may be included in operating system 535, application programs 536, program modules 537 and/or program data 538, for storage in system memory 522.

When a mass storage device, such as, for example, magnetic hard disk 539, is coupled to computer system 520, such modules and associated program data may also be stored in the mass storage device. In a networked environment, program modules depicted relative to computer system 520, or portions thereof, can be stored in remote memory storage devices, such as, system memory and/or mass storage devices associated with remote computer system 583 and/or remote computer system 593. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computing system that has access to a set of control points for generating an outline for rendering a graphical object, some control points having one or more constraints thereon, a computerized method for automatically and dynamically determining one or more directions of freedom and an order for applying the one or more directions of freedom to move a control point in a manner that complies with a constraint and with a reduced likelihood of causing non-compliance with other of the one or more constraints, the method comprising:

(a) receiving a set of control points representing a graphical object;

(b) receiving one or more constraints on the set of control points for the graphical object;

(c) for a particular control point, identifying a first constraint applied to the control point;

(d) identifying a first direction of compliance in which compliance with the first constraint is measured;

(d) calculating, based on a location of the control point, that the control point does not comply with the first constraint;

(e) automatically and dynamically determining an order for setting directions of freedom and for moving the control point in the directions of freedom, based on a comparison of at least two angles defined between the first direction of compliance and first and second axes, comprising:

(i) calculating a first angle between the first direction of compliance and the first axis and calculating a second angle between the first direction of compliance and the second axis;

(ii) comparing the first angle with the second angle and determining that the first angle is less than the second angle, such that the first direction of compliance is closer to the first axis than the second axis; and (iii) based on the determination that the first angle is less than the second angle and that the first direction of compliance is closer to the first axis than the second axis, setting the first axis as the first direction of freedom for moving the control point, and prior to setting the second direction of freedom for subsequently moving the control point, and such that the order in which the directions of freedom are set is automatically and dynamically dependent upon a magnitude of each of the first and second angles; and (f) on a display device, rendering the graphical object using the set first direction of freedom and the set second direction of freedom, in the determined order.

2. The method of claim 1, wherein identifying a first constraint applied to the control point comprises identifying a first function that represents the first constraint, wherein solutions to the first function indicate compliance with the first constraint.

3. The method of claim 1, wherein identifying a first constraint comprises identifying at least one of a distance constraint and a proportion constraint.

4. The method of claim 1, wherein calculating, based on a location of the control point, that the control point does not comply with the first constraint comprises determining that using the control point as input to a first function does not result in a value that approximates a zero.

5. The method of claim 1, wherein the first and second axes are each in the direction of one of an X axis or a Y axis.

6. The method of claim 1, further comprising:
moving the control point in the first direction of freedom to comply with the first constraint.

7. The method of claim 1, further comprising: identifying a second constraint applied to the control point; and
using the first direction of compliance to set a second direction of freedom.

8. The method of claim 7, wherein the first direction of compliance is at a diagonal, and wherein using the first direction of compliance to set a second direction of freedom comprises setting the second direction of freedom perpendicular to the first direction of compliance, such that the second direction of freedom is at a diagonal.

9. The method of claim 1, further comprising: identifying a second constraint applied to the control point, and wherein automatically and dynamically determining an order for applying one or more directions of freedom comprises determining that the first constraint should be complied with before the second constraint because a non-diagonal direction of freedom is determined for the first constraint while a diagonal direction of freedom is determined for the second constraint.

10. The method of claim 9, further comprising: moving the control point, in the direction of the first direction of freedom, to a location that results in compliance with the first constraint; and
moving the control point in the direction of the second direction of freedom in a manner that does not result in non-compliance with the first constraint.

11. The method of claim 1, wherein the graphical object is a character of text.

12. The method of claim 1, wherein the received set of control points and one or more constraints define the first constraint and the first direction of compliance, and without specifying the first direction of freedom.

13. The method of claim 1, further comprising: for each control point in the set of control points, determining a number of constraints the control point is to comply with.

14. The method of claim 1, wherein acts (c)-(e) are repeated for each control point in the set of control points which has a constraint thereon.

15. A computer program product for use in a computing system that has access to a set of control points for generating an outline for rendering a graphical object, some control points having one or more constraints thereon, the computer program product for implementing a computerized method for dynamically determining one or more directions of freedom and an order for applying the one or more directions of freedom to move a control point in a manner that complies with a constraint and with a reduced likelihood of causing non-compliance with other of the one or more constraints, the computer program product comprising:

one or more computer-readable media having stored thereon computer executable instructions that, when executed by a processor, cause the computing system to perform the following:

receive a set of control points representing a graphical object;

receive one or more constraints on the set of control points for the graphical object;

for a particular control point, identify a first constraint applied to the control point;

identify a first direction of compliance in which compliance with the first constraint is measured;

calculate, based on a location of the control point, that the control point does not comply with the first constraint;

automatically and dynamically determine an order for setting directions of freedom and for moving the control point in the directions of freedom, based on a comparison of at least two angles defined between the first direction of compliance and first and second axes, comprising:

calculating a first angle between the first direction of compliance and the first axis and to calculate a second angle between the first direction of compliance and the second axis;

comparing the first angle with the second angle and determining that the first angle is less than the second angle, such that the first direction of compliance is closer to the first axis than the second axis; and based on the determination that the first angle is less than the second angle and that the first direction of compliance is closer to the first axis than the second axis, setting the first axis as the first direction of freedom for moving the control point, and prior to setting the second direction of freedom for subsequently moving the control point, and such that the order in which the directions of freedom are set is automatically and dynamically dependent upon a magnitude of each of the first and second angles; and on a display device, render the graphical object using the set first direction of freedom and the set second direction of freedom, in the determined order.

16. A computing system that has access to a set of control points for generating an outline for rendering of a graphical object, some control points having one or more constraints thereon, the computing system being adapted to perform a method for dynamically determining one or more directions of freedom and an order for applying the one or more directions of freedom to move a control point in a manner that complies with a constraint and with a reduced likelihood of causing non-compliance with other of the one or more constraints, the system comprising:

a processor;

one or more computer readable media having computer executable instructions stored thereon which, when executed by the processor, cause the computing system to perform the following:
   access a set of control points representing a graphical object;
   access one or more constraints on the set of control points for the graphical object;
   for a particular control point, identify a first constraint applied to the control point;
   identify a first direction of compliance in which compliance with the first constraint is measured;
   calculate, based on a location of the control point, that the control point does not comply with the first constraint; and
   automatically and dynamically determine an order for setting directions of freedom and for moving the control point in the directions of freedom, based on a comparison of at least two angles defined between the first direction of compliance and first and second axes, comprising:
      calculating a first angle between the first direction of compliance and the first axis and to calculate a second angle between the first direction of compliance and the second axis;
      comparing the first angle with the second angle and determining that the first angle is less than the second angle, such that the first direction of compliance is closer to the first axis than the second axis; and
      based on the determination that the first angle is less than the second angle and that the first direction of compliance is closer to the first axis than the second axis, setting the first axis as the first direction of freedom for moving the control point, and prior to selling the second direction of freedom for subsequently moving the control point, and such that the order in which the directions of freedom are set is automatically and dynamically dependent upon a magnitude of each of the first and second angles; and
a display device for rendering the graphical object having an outline with control points which satisfy the one or more constraints.

* * * * *